(12) United States Patent
Han et al.

(10) Patent No.: US 6,612,162 B2
(45) Date of Patent: Sep. 2, 2003

(54) METHOD OF DETERMINING CAM PHASE ANGLE

(75) Inventors: Jun Han, Wixom, MI (US); Dennis C. Reed, Plymouth, MI (US); Louis J. Baumgartner, Livonia, MI (US)

(73) Assignee: Delphi Technologies, Inc., Troy, MI (US)

( * ) Notice: Subject to any disclaimer, the term of this patent is extended or adjusted under 35 U.S.C. 154(b) by 149 days.

(21) Appl. No.: 09/725,443

(22) Filed: Nov. 29, 2000

(65) Prior Publication Data

US 2002/0062685 A1 May 30, 2002

(51) Int. Cl.[7] .............................................. G01M 15/00
(52) U.S. Cl. ..................................... 73/117.3; 73/117.3
(58) Field of Search .............................. 123/90.15, 414, 123/478, 612, 90.17; 73/117.3, 117.2, 116

(56) References Cited

U.S. PATENT DOCUMENTS 5,245,968 A * 9/1993 Kolias et al. ................ 123/414

* cited by examiner

Primary Examiner—Kamand Cuneo
Assistant Examiner—Monica D. Harrison
(74) Attorney, Agent, or Firm—Vincent A. Cichosz

(57) ABSTRACT

A method of determining the phase angle of an internal combustion engine camshaft relative to a crankshaft of the engine, which significantly reduces the computational burden compared to conventional methods. The cam and crankshaft position pulses are identified by corresponding clock values, and the cam phase angle relative to the crankshaft is determined by computing a simple ratio of first and second time intervals based on the clock values, and multiplying the ratio by a known angle. One of the time intervals is defined by a time difference between successive crankshaft and camshaft pulses, while the other time interval is defined by a time difference between successive crankshaft pulses. The known angle is the angle of crankshaft rotation between the successive crankshaft pulses. The cam phase angle velocity is obtained by determining a change in cam phase angle, and dividing by the intervening time interval.

6 Claims, 2 Drawing Sheets

METHOD OF DETERMINING CAM PHASE ANGLE

TECHNICAL FIELD

The present invention is directed to the control of a variable phase mechanism for a camshaft of an internal combustion engine, and more particularly to a method of determining the phase angle of the camshaft relative to an engine crankshaft.

BACKGROUND OF THE INVENTION

Mechanisms for continuously varying the phase of a camshaft (intake and/or exhaust) relative to the crankshaft for purposes of reducing exhaust gas emissions and improving engine performance are well known in the art of internal combustion engine controls. In general, accurate knowledge of the actual cam phase angle and its rate of change with respect to time are essential to the achievement of accurate phase angle control. The conventional approach to determining cam phase angle involves determining the engine speed, computing a displacement between the camshaft and crankshaft according to the product of engine speed and the time between crankshaft and camshaft position pulses, and then converting the computed displacement to a corresponding phase angle. The cam phase angle velocity, in turn, is obtained by determining a change in cam phase angle, and dividing by the intervening time interval. These calculations are repeatedly performed in synchronism with engine rotation, and obviously create a substantial computational burden for the system controller. Accordingly, what is desired is a more efficient and less burdensome method of determining the cam phase angle and its rate of change.

SUMMARY OF THE INVENTION

The present invention is directed to an improved method of determining the phase angle of an internal combustion engine camshaft relative to a crankshaft of the engine, which significantly reduces the computational burden compared to conventional methods. According to the invention, the cam and crankshaft position pulses are identified by corresponding clock values, and the cam phase angle relative to the crankshaft is determined by computing a simple ratio of first and second time intervals based on the clock values, and multiplying the ratio by a known angle. One of the time intervals is defined by a time difference between successive crankshaft and camshaft pulses, and the other time interval is defined by a time difference between successive crankshaft pulses. The known angle is the angle of crankshaft rotation between the successive crankshaft pulses. As with the known method, the cam phase angle velocity is obtained by determining a change in cam phase angle, and dividing by the intervening time interval.

DESCRIPTION OF THE PREFERRED EMBODIMENT

Figure 1:
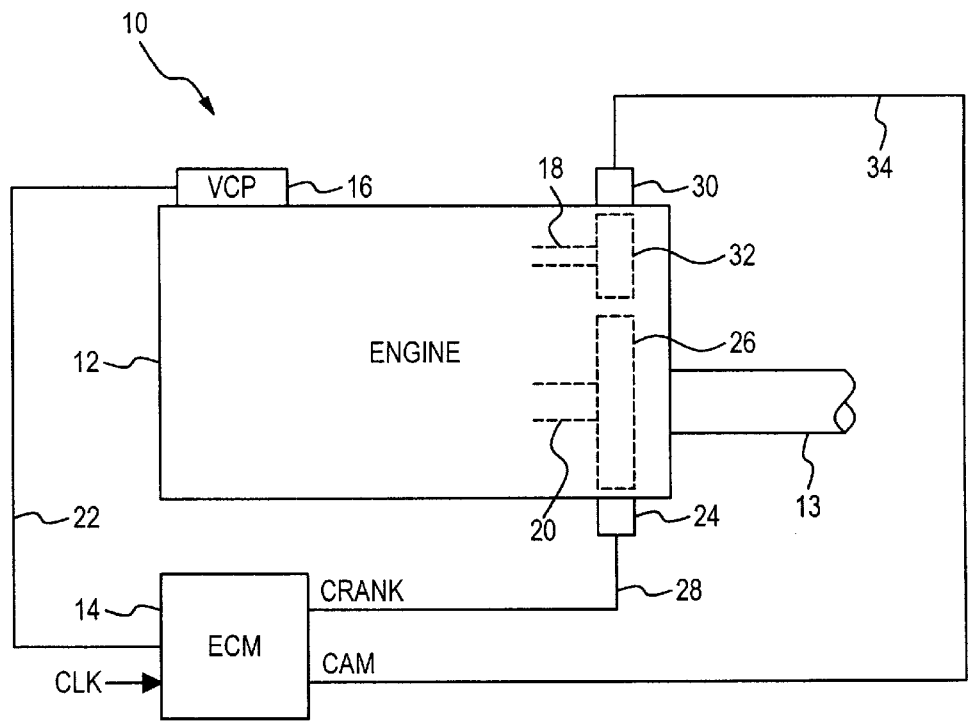
FIG. 1 is a diagram of a motor vehicle powertrain, including an internal combustion engine and a microprocessor-based engine control unit.

Referring to FIG. 1, the reference numeral 10 generally depicts a motor vehicle powertrain including an internal combustion engine 12 having an output shaft 13 and a microprocessor-based engine control module (ECM) 14. The engine 10 is equipped with a variable cam phase mechanism (VCP) 16 that controls the phase relationship between the engine camshaft 18 and crankshaft 20 in response to a control signal produced by ECM 14 on line 22. A crankshaft position sensor 24 is responsive to the passage of teeth formed on a flywheel 26 attached to crankshaft 20, and produces a CRANK signal on line 28 that includes a pulse corresponding to the passage of each flywheel tooth. Similarly, a camshaft position sensor 30 is responsive to the passage of teeth formed on a wheel 32 attached to camshaft 18, and produces a CAM signal on line 34 that includes a pulse corresponding to the passage of each tooth of wheel 32.

The ECM 14 carries out a number of control routines for operating engine 12, most of which are conventional in nature and therefore not addressed herein. In relation to the present invention, for example, ECM includes a conventional control routine for determining a desired phase relationship between camshaft 18 and crankshaft 20, and a closed-loop control (such as a conventional PID control) for adjusting the control signal on line 22 to bring the actual phase angle of camshaft 18 into correspondence with the desired phase angle. The present invention is directed to a routine carried out by ECM 14 for determining the actual phase angle of camshaft 18 and its rate of change based on the pulsed signals CRANK and CAM, as explained below. In the illustrated embodiment, ECM 14 also receives an external clock signal CLK, although it will be understood that a similar signal may be generated internally.

Figure 2:
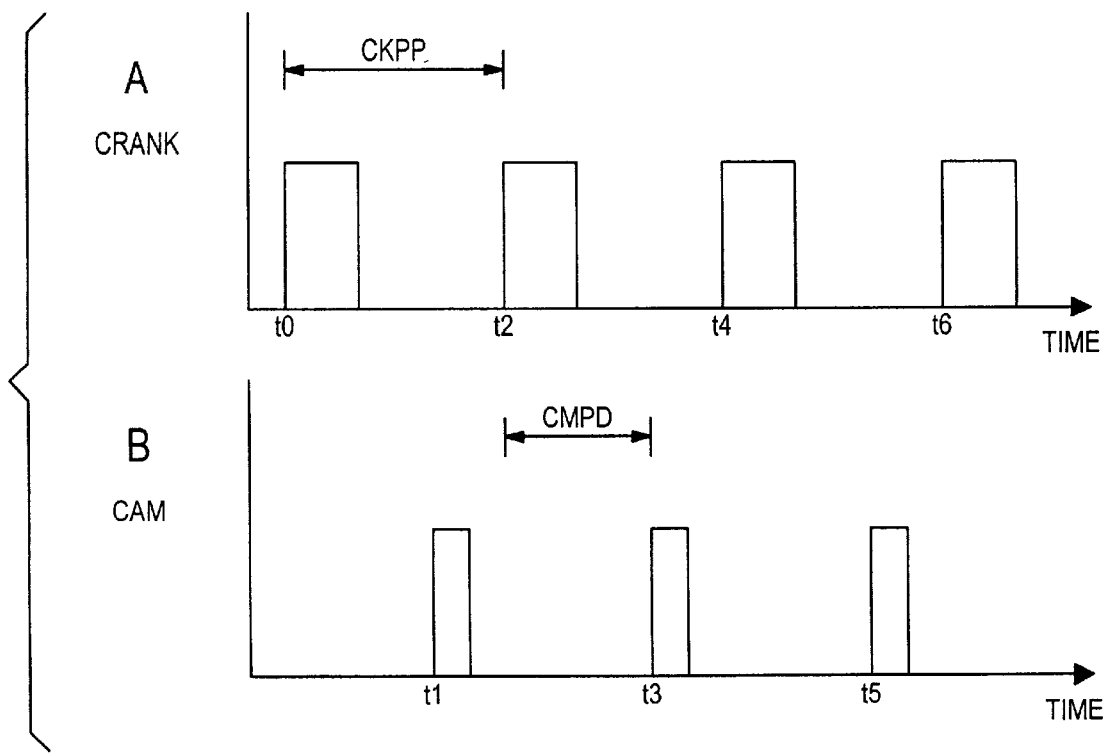
FIG. 2, Graphs A–B, respectively depict a series of crankshaft and camshaft position pulses developed during operation of the engine of FIG. 1.

Graphs A and B of FIG. 2 respectively depict representative CRANK and CAM pulse signals developed during operation of engine 12. The leading edges of the pulses are designated by the times t0–t6, and generate interrupts for ECM 14. In response to each such interrupt, ECM 14 records a clock value, which is used as explained herein to determine the relative timing of the pulses, and the actual phase angle of camshaft 18 relative to crankshaft 20.

According to this invention, the cam phase angle is determined by computing a simple ratio of first and second time intervals and multiplying the ratio by a known angle $\alpha_{ck}$. One of the time intervals, referred to herein as the cam pulse delay CMPD, is defined by a time difference between successive crankshaft and camshaft pulses, as indicated for example, by the interval (t3–t2) in FIG. 2. The other time interval, referred to herein as the crank pulse period CKPP, is defined by a time difference between successive crankshaft pulses, as indicated for example, by the interval (t2–t0) in FIG. 2. The known angle $\alpha_{ck}$ is the angle of crankshaft rotation between the successive crankshaft pulses. In equation form, the cam phase angle CAM_PH_ANGLE is given by:

$$CAM\_PH\_ANGLE = (\alpha_{ck} * CMPD)/CKPP \quad (1)$$

The camshaft phase angle velocity Vcam, in turn, can be readily obtained by determining the cam phase angle as described above in successive revolutions of the flywheel 26, computing the difference ΔCAM_PH_ANGLE between successively determined cam phase angles, and dividing the difference by the intervening time ΔTcam. In equation form, ΔCAM_PH_ANGLE is given by:

$$\Delta CAM\_PH\_ANGLE = F*(CAM\_PH\_ANGLE1 - CAM\_PH\_ANGLE2) \quad (2)$$

where CAM_PH_ANGLE1 and CAM_PH_ANGLE2 are the successively determined cam phase angles, and F is a coefficient corresponding to the number of revolutions of the camshaft 18 per revolution of crankshaft 20. The cam phase angle velocity Vcam is then given by:

$$V\text{cam} = \Delta CAM\_PH\_ANGLE / \Delta T\text{cam} \quad (3)$$

Typically, the flywheel 26 is notched or otherwise marked so that the crankshaft pulse corresponding to a particular flywheel tooth can be easily identified. This enables CAM_PH_ANGLE1 and CAM_PH_ANGLE2 to be determined based on the same cam wheel tooth, which minimizes error due to irregularities in the tooth shape and/or distribution.

Figure 3:
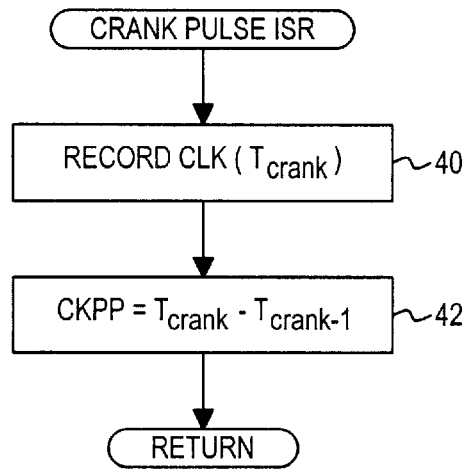
FIG. 3 is a flow diagram representative of an interrupt service routine executed by the engine control unit of FIG. 1 in response to the crankshaft position pulses depicted in Graph A of FIG. 2.
Figure 4:
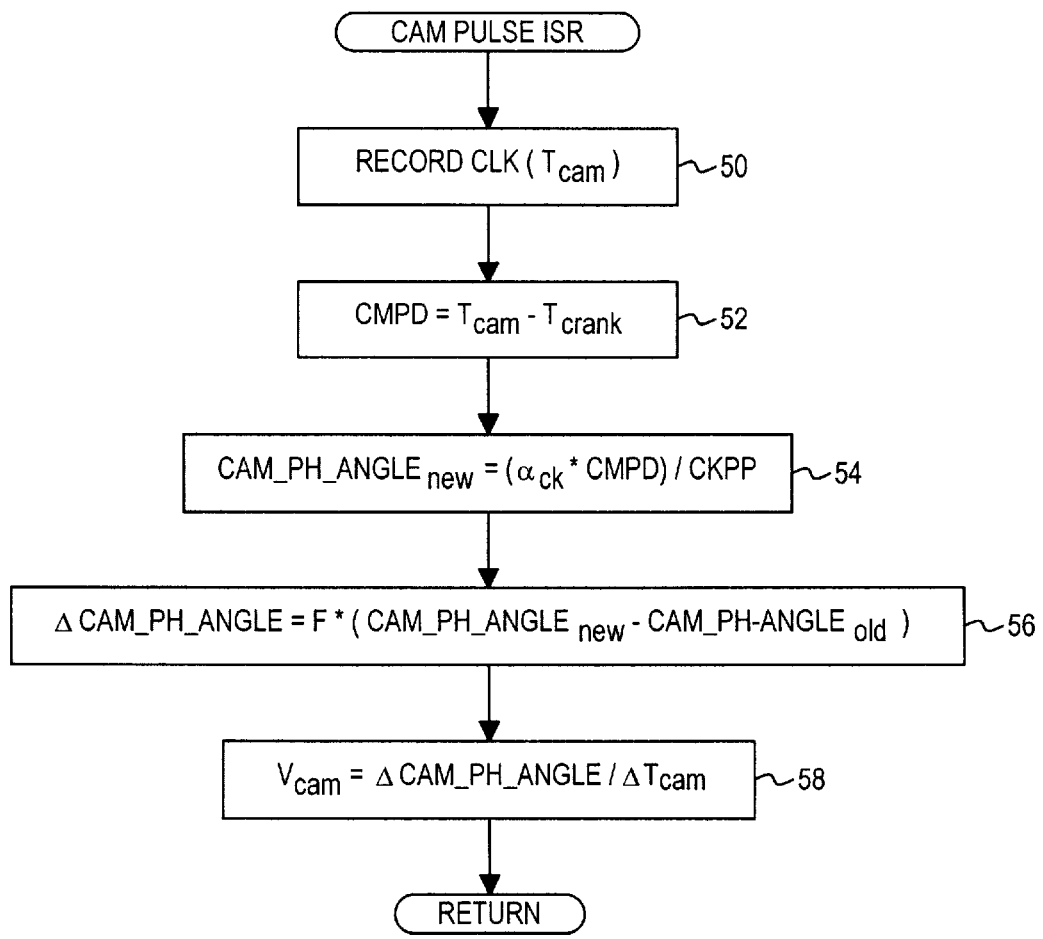
FIG. 4 is a flow diagram representative of an interrupt service routine executed by the engine control unit of FIG. 1 in response to the camshaft position pulses depicted in Graph B of FIG. 2.

FIGS. 3 and 4 are flow diagrams representative of interrupt service routines executed by ECM 14 in response to the interrupts generated at the leading edge of each crank and cam pulse. The crank pulse interrupt service routine of FIG. 3 is very simple, and essentially involves recording a clock value and computing the crank pulse period CKPP, as indicated at blocks 40 and 42, respectively. The cam pulse interrupt service routine of FIG. 4 involves recording a clock value, determining the cam pulse delay CMPD, computing the cam phase angle CAM_PH_ANGLE, the difference ΔCAM_PH_ANGLE, and the cam angle velocity Vcam, as indicated by the respective blocks 50, 52, 54, 56 and 58. Of course, the phase angle and velocity computations may be performed by a main or executive routine instead of the interrupt service routine, if desired.

In summary, the present invention provides a simple and efficient method of determining the cam phase angle and its rate of change by characterizing the cam phase angle as a simple ratio of first and second time intervals based on crank and cam pulse interrupts. While described in reference to the illustrated embodiment, it is expected that various modifications in addition to those mentioned above will occur to those skilled in the art. Accordingly, it will be understood that methods incorporating these and other modifications may fall within the scope of this invention, which is defined by the appended claims.

What is claimed is:

1. A method of operation for an internal combustion engine having a rotary crankshaft and a rotary camshaft, the camshaft having a variable phase angle of rotation relative to the crankshaft, the method comprising the steps of:

receiving a series of crankshaft pulses representative of crankshaft rotation, and a series of camshaft pulses representative of camshaft rotation;

determining a first time interval according to an elapsed time between successively received crankshaft pulses;

determining a second time interval according to an elapsed time between successively received crankshaft and camshaft pulses; and determining a phase angle of said camshaft with respect to said crankshaft based on a ratio of said second time interval to said first time interval.

2. The method of operation of claim 1, wherein the phase angle of the camshaft with respect to the crankshaft is determined according to a product of said ratio and an angle of crankshaft rotation between said successively received crankshaft pulses.

3. The method of operation of claim 1, including the step of:

determining a rate of change of said phase angle of rotation with respect to time based on a phase angle difference between successively determined phase angles, a time interval between said successively determined phase angles, and a number of revolutions of said camshaft for each revolution of said crankshaft.

4. A method of estimating a rotational phase angle of a first rotary shaft with respect to a second rotary shaft, comprising the steps of:

producing a first series of pulses based on rotation of said first rotary shaft, and a second series of pulses based on rotation of said second rotary shaft;

receiving said first and second series of pulses and assigning times of receipt thereto;

determining a first time interval according to a difference in assigned times of receipt between successively received pulses in said second series of pulses;

determining a second time interval according to a difference in assigned times of receipt between a received pulse of said second series of pulses and a subsequently received pulse of said first series of pulses; and determining the rotational phase angle of said first rotary shaft with respect to said second rotary shaft based on a ratio of said second time interval to said first time interval.

5. The method of claim 4, wherein the rotational phase angle of said first rotary shaft with respect to said second rotary shaft is determined according to a product of said ratio and an angle of rotation of said second rotary shaft between said successively received pulses in said second series of pulses.

6. The method of claim 4, including the step of:

determining a rate of change of said rotational phase angle with respect to time based on a difference between successively determined rotational phase angles, a time interval between said successively determined rotational phase angles, and a number of revolutions of said first rotary shaft for each revolution of said second rotary shaft.

* * * * *